United States Patent
Iqbal et al.

(10) Patent No.: US 7,482,083 B2
(45) Date of Patent: Jan. 27, 2009

(54) CORROSION RESISTANT COATED FUEL CELL BIPOLAR PLATE WITH FILLED-IN FINE SCALE POROSITIES

(75) Inventors: Zafar Iqbal, Morristown, NJ (US); Dave Narasimahan, Flemington, NJ (US); James V. Guiheen, Madison, NJ (US); Timothy Rehg, Rancho Palos Verdes, CA (US)

(73) Assignee: General Electric Company, Schenectady, NY (US)

(*) Notice: Subject to any disclaimer, the term of this patent is extended or adjusted under 35 U.S.C. 154(b) by 1230 days.

(21) Appl. No.: 10/605,035

(22) Filed: Sep. 3, 2003

(65) Prior Publication Data

US 2004/0106029 A1    Jun. 3, 2004

Related U.S. Application Data

(62) Division of application No. 09/415,466, filed on Oct. 8, 1999, now Pat. No. 6,649,031.

(51) Int. Cl.
    *H01M 2/00*      (2006.01)
(52) U.S. Cl. ....................................................... 429/34
(58) Field of Classification Search ................... 429/34
See application file for complete search history.

(56) References Cited

U.S. PATENT DOCUMENTS

| | | | |
|---|---|---|---|
| 3,940,285 A | 2/1976 | Nickols, Jr. et al. | 136/86 |
| 4,444,642 A | 4/1984 | Hinden et al. | 204/290 |
| 4,743,519 A | 5/1988 | Kaji et al. | 429/36 |
| 4,778,736 A | 10/1988 | Kaji et al. | 429/38 |
| 5,316,632 A | 5/1994 | Remppel | 204/146 |
| 5,419,824 A | 5/1995 | Weres et al. | 204/268 |
| 5,460,897 A | 10/1995 | Gibson et al. | 429/39 |
| 5,482,792 A | 1/1996 | Faita et al. | 429/30 |
| 5,521,018 A | 5/1996 | Wilkinson et al. | 42/26 |
| 5,578,388 A | 11/1996 | Faita et al. | 429/30 |
| 5,624,769 A | 4/1997 | Li et al. | 429/32 |
| 5,776,624 A | 7/1998 | Neutzler | 429/26 |
| 5,853,917 A | 12/1998 | Fauteux | 429/194 |
| 5,856,035 A | 1/1999 | Khandkar et al. | 429/32 |
| 5,868,912 A | 2/1999 | Reichert et al. | 204/252 |
| 5,939,219 A | 8/1999 | Jansing et al. | 429/32 |
| 5,955,215 A | 9/1999 | Kurzweil et al. | 429/41 |
| 6,291,094 B1* | 9/2001 | Yoshimura et al. | 429/34 |

FOREIGN PATENT DOCUMENTS

| | | |
|---|---|---|
| DE | 199 46 695 A1 | 4/2000 |
| EP | 521045 B1 | 11/1997 |
| EP | 0 955 686 A1 | 11/1999 |

(Continued)

*Primary Examiner*—Patrick Ryan
*Assistant Examiner*—Thomas H. Parsons
(74) *Attorney, Agent, or Firm*—Sutherland Asbill & Brennan LLP

(57) ABSTRACT

A corrosion resistant coated fuel cell plate and method of making the same are embodied in a metal plate provided with a multilayered conductive coating and then with an overcoat which fills in fine scale porosities in the coating. In one preferred embodiment, the overcoating is amorphous graphite applied through a deposition process. In another preferred embodiment, overcoating is a thin layer of oxide created by chemical anodization process.

26 Claims, 3 Drawing Sheets

FOREIGN PATENT DOCUMENTS

| | | |
|---|---|---|
| JP | 10-255823 | 9/1998 |
| JP | 10-308226 | 11/1998 |
| JP | 2000-67881 | 3/2000 |
| JP | 2000-164228 | 6/2000 |
| WO | WO 96/35825 | 11/1996 |
| WO | 97/35349 | 9/1997 |
| WO | WO 00/21152 | 4/2000 |

* cited by examiner

CORROSION RESISTANT COATED FUEL CELL BIPOLAR PLATE WITH FILLED-IN FINE SCALE POROSITIES

CROSS REFERENCE TO RELATED APPLICATIONS

This application is a divisional of U.S. application Ser. No. 09/415,466, filed Oct. 8, 1999, now pending, which is related to U.S. application Ser. No. 09/415,781, also filed Oct. 8, 1999.

FEDERAL RESEARCH STATEMENT

This invention was made with support from the government of the United States of America. The government of the United States of America may have certain rights in this invention.

BACKGROUND OF INVENTION

The present invention relates generally to a corrosion resistant coated fuel cell bipolar plate and a method for making the same and, more specifically, to a coated, corrosion resistant coated fuel cell bipolar plate with filled-in fine scale porosities and a method of making the same.

Fuel cells such as the Proton Exchange Membrane ("PEM") fuel cell include a membrane electrode assembly ("MEA"). The MEA comprises a solid polymer electrolyte or ion exchange membrane positioned between an anode and a cathode which typically comprise finely divided carbon particles, very finely divided catalytic particles supported on the internal and external surfaces of the carbon particles, and proton conductive material intermingled with the catalytic and carbon particles.

The catalytic particles, e.g., finely comminuted platinum, at each membrane/electrode interface induce the desired electrochemical reaction. On the anode side, the fuel (e.g., hydrogen) permeates the porous electrode material and reacts with the catalytic particles to form hydrogen cations (e.g., protons) which migrate through the ion exchange membrane to the cathode side. On the cathode side, the oxidant (e.g., oxygen-containing gas) reacts with the catalytic particles to form oxygen anions. At the cathode, the anions react with the cations to complete the electrochemical reaction and form a reaction product (e.g., liquid water).

In conventional fuel cells, the MEA is positioned between a pair of electrically conductive elements, typically plates, which serve as current collectors for the anode and cathode. The plates are often formed with channels to facilitate the distribution of the aforementioned gaseous reactants over the anode and cathode catalyst surfaces. When a plurality of fuel cells are configured as a stack to form a series electrical connection between them, the plates provide the electrical connection and are often referred to as bipolar plates. In such a configuration, each bipolar plate conducts current from the anode of one cell to the cathode of the adjacent cell in the stack.

In the PEM fuel cell environment, bipolar plates (and septums) are subject to corrosion. Therefore, in addition to having sufficient electrical conductivity to provide high performance in a PEM fuel cell, bipolar plates should also be corrosion-resistant so as to maintain adequate conductivity over extended periods of time. Graphite plates exhibit these qualities, but are generally brittle and expensive to manufacture. Noble metals such as platinum are highly corrosion-resistant and manufacturable as lightweight thin plates, but the raw material costs for these plates would be prohibitive for many commercial applications. Lightweight metals such as aluminum and titanium and their alloys are not corrosion resistant in the PEM fuel cell environment, and contact elements made therefrom typically deteriorate rapidly, or they form highly electrically resistant oxide films on their surface that increase the internal electrical resistance of the fuel cell and reduce its performance.

Thus, a need exists for a fuel cell bipolar plate made from a non-noble, lightweight metal such as aluminum or titanium with surfaces that are protected against corrosion by an electrically conductive, oxidation-resistant barrier, coating or cladding.

SUMMARY OF INVENTION

In an exemplary preferred embodiment, a metal fuel cell bipolar plate is provided with a conductive multilayer coating and then with an overcoating which fills in the fine scale porosities in the underlying coating. The dimensions of the coating and the overcoating are selected so that the electrical conductivity of the bipolar plate is not compromised. The overcoating provides sealing of fine scale porosities and can be continuous if it has inherent conductivity, for example, an overcoating formed from a slurry of amorphous carbon or a suboxide of titanium. In the case of amorphous carbon, this overcoating is also hydrophobic, which further prevents corrosive electrolytes from penetrating microporosities in the coating.

In another exemplary preferred embodiment, a metal fuel cell bipolar plate is provided with a conductive multilayer coating, and then a chemical anodization process is employed to fill in the fine scale porosities in the underlying coating with a discontinuous overcoating which may not have high electrical conductivity, for example, an aluminum oxide, but which guides electrical charge to the coating through discontinuities in the overcoating. The filling in of the porosities prevents corrosive electrolytes from attacking the coated fuel cell bipolar plate.

In another exemplary preferred embodiment, a metal fuel cell bipolar plate is provided with a thin, graphite emulsion coating and then a layer of graphite foil is pressed over the underlying coating. The emulsion of graphite seals in microporosities present in the graphite foil. Additionally, the hydrophobic nature of the graphite emulsion coating and the graphite foil helps prevent corrosive electrolytes from attacking the coated fuel cell bipolar plate.

The above described and many other features and attendant advantages of the present invention will become apparent as the invention becomes better understood by reference to the following detailed description when considered in conjunction with the accompanying drawings.

BRIEF DESCRIPTION OF DRAWINGS

Detailed description of preferred embodiments of the invention will be made with reference to the accompanying drawings.

DETAILED DESCRIPTION

The following is a detailed description of the best presently known mode of carrying out the invention. This description is not to be taken in a limiting sense, but is made merely for the purpose of illustrating the general principles of the invention.

Figure 1:
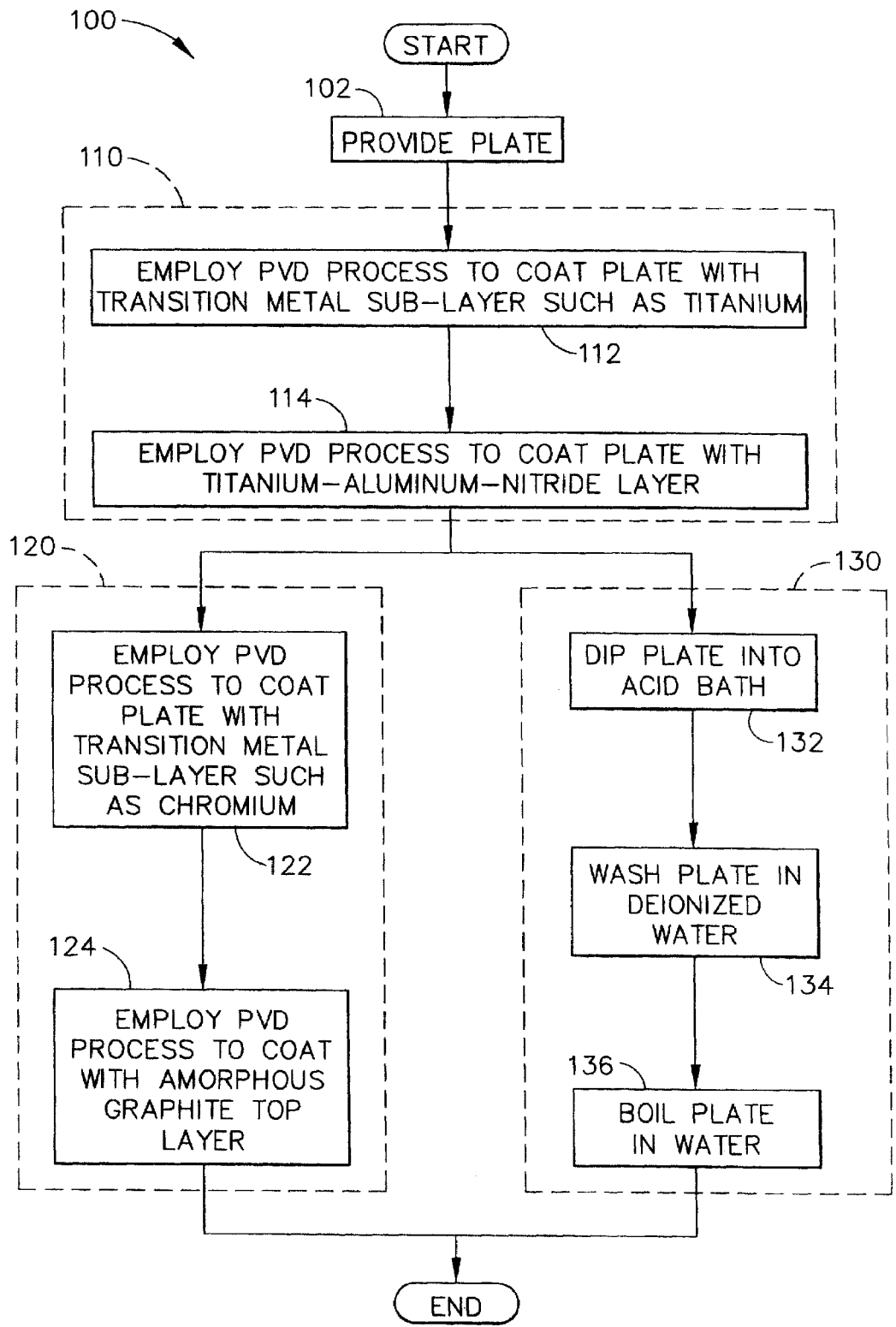
FIG. 1 is a flowchart of two exemplary preferred methods for coating and overcoating a bipolar plate of a fuel cell according to the present invention.
Figure 3:
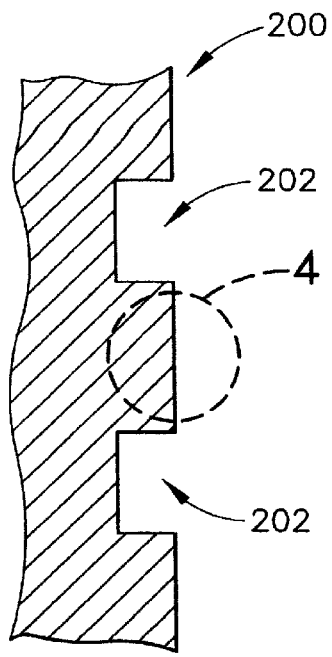
FIG. 3 is a cross-sectional, partial side view of a fuel cell bipolar plate.

Referring to FIG. 1, an exemplary preferred method 100 according to the present invention for passivating a bipolar plate for a fuel cell first includes a step 102 of providing a fuel cell bipolar plate 200 (FIG. 3) which can be formed from any metal, noble or non-noble. The fuel cell bipolar plate 200 preferably comprises aluminum, an aluminum alloy or stainless steel, is 0.05-2.0 millimeters thick and has flow fields 202 stamped on both sides (only one side of the bipolar plate 200 is shown in FIG. 3). Alternative preferred materials for the fuel cell bipolar plate 200 include, but are not limited to, titanium, niobium, chromium, tin, molybdenum, zinc, stainless steel and nickel. Furthermore, it should be understood that the principles of the present invention are not limited to bipolar plates and are equally applicable to end plates, current collector elements and electrically conductive elements configured in shapes other than that of a plate.

Figure 4A:
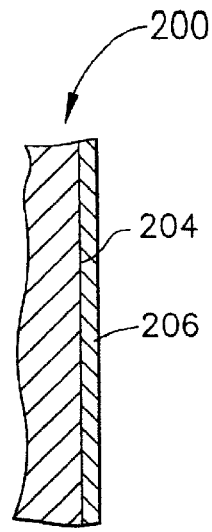
FIG. 4A is an enlarged view of a portion of the fuel cell bipolar plate of FIG. 3 after it has been coated with a sub-layer of transition metal such as titanium.
Figure 4B:
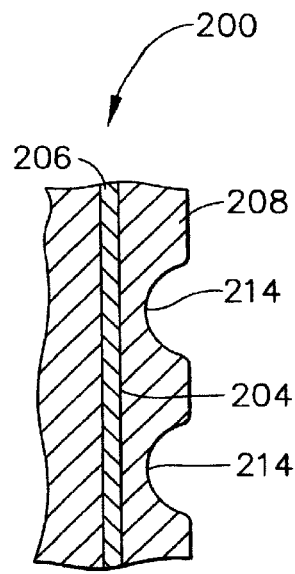
FIG. 4B shows the fuel cell bipolar plate of FIG. 4A after it has been coated with a layer of titanium aluminum nitride.

Generally, the method 100 includes a coating step 110 and one of a deposition overcoating step 120 or a chemical anodization overcoating step 130. In an exemplary preferred embodiment, the coating step 110 includes a step 112 of coating a top surface 204 (FIG. 4A) of the bipolar plate 200 with a transition metal sub-layer 206 (FIG. 4A) and then a step 114 of coating the sub-layer 206 with a layer 208 (FIG. 4B) of conductive material. Both the sub-layer 206 and the layer 208 are electrically conductive. The sub-layer 206 and layer 208 are selected such that the layer 208 will adhere to the sub-layer 206 during sputtering. The sub-layer 206 comprises, for example, titanium sputtered over the top surface 204 to a thickness of approximately 1 micron. The sub-layer 206 can also be formed from other conductive materials, e.g., stainless steel.

An exemplary preferred layer 208 comprises a range of compositions for titanium aluminum nitride ($Ti_xAl_yN$), where $x=0.50$-$0.75$ and $y=0.25$-$0.50$. Preferred values for x and y are 0.70 and 0.30, respectively. The titanium aluminum nitride layer 208 is formed, for example, by simultaneously sputtering Ti and Al with a nitrogen bleed. The thickness of the layer 208 is preferably in the range of 1 to 5 microns. The addition of Al to Ti reduces the density of d-electron states and therefore the oxidation stability of the coating layer 208. The electrical conductivity of the layer 208 is also reduced relative to TiN by the addition of Al, but still remains very high at the above composition. Typical resistivities are below 1 milliohm-centimeter. Alternative compositions for the coating 208 include, but are not limited to, titanium nitride, titanium carbide, an alloy of titanium nitride and titanium carbide, which is also referred to as titanium carbonitride, zirconium nitride and chromium nitride.

A physical vapor deposition ("PVD") process is preferably used to deposit the sub-layer 206 and the layer 208. A closed-field, unbalanced magnetron sputter ion plating system (see, e.g., European Patent Specification EP 0 521 045 B1, the entirety of which is incorporated herein by reference) is preferably employed during the entire coating step 110. In such a system, unbalanced magnetrons are employed in an arrangement whereby neighboring magnetrons are of opposite magnetic polarity. Linked magnetic field lines surround the deposition zone where the substrates are located. This results in significant plasma enhancement due to trapping of the plasma and prevention of ionizing electron losses. The two main features of such a system are that: (1) high current density is used to improve both the coating structure and adhesion, and (2) low bias operation is used to deposit coatings at low temperatures and with minimal internal stresses.

Significantly, the low bias (near-zero), low temperature operation causes the crystalline particles of the coating 208 to be smaller in size and more rounded which provides improved meshing of grain boundaries. This, in turn, results in smaller porosities in the coating 208.

After the bipolar plate 200 has been stamped or machined with flow field patterns, gas inlets, etc., it is degreased, dried and reductively plasma-etched in the reactor. Cleaning prior to deposition is carried out with the magnetrons switched on at low power. The use of magnetrons at this stage allows a plasma to strike to the plates at low argon pressure of approximately 1 Torr.

After an initial pump down to a pressure of $10^{-6}$ Torr, the sub-layer 206 and the layer 208 are formed on the plate 200, which is held at room temperature in the deposition chamber. During the deposition process, the temperature of the plate rises to between 200° C. and 350° C. due to plasma bombardment. Through appropriate shielding and current control in the deposition chamber, multiple targets can be employed in a conventional fashion to provide the Ti/TiAlN graded coating described above. Although magnetron sputtering is preferred because it provides coatings with low porosity, the scope of the present invention additionally contemplates employing alternative deposition processes such as cathodic arc sputtering and low temperature metal-organic chemical vapor deposition ("MOCVD").

On examination under a scanning electron microscope, The magnetron-sputtered titanium aluminum nitride layer 208 shows no open porosity in the 0.1 to 1.0 micrometer size range. However, potentiodynamic corrosion currents measured at 900 mV versus a saturated calomel electrode suggest that porosities below this range are present. The overcoating steps 120, 130 alternative processes for sealing the fine scale porosity in the titanium aluminum nitride coating 208 are discussed below.

Figure 4C:
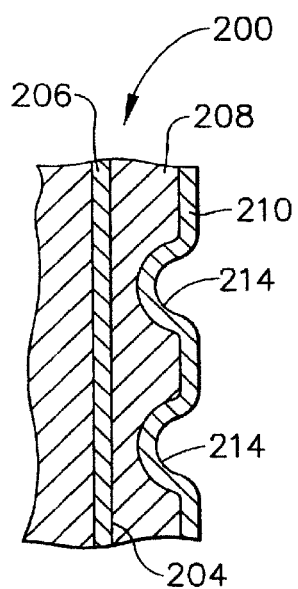
FIG. 4C shows the fuel cell bipolar plate of FIG. 4B after it has been overcoated with a sub-layer of transition metal such as chromium.
Figure 4D:
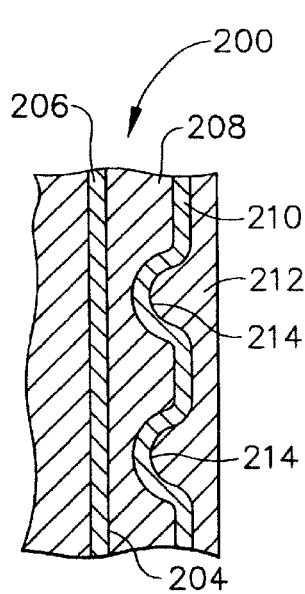
FIG. 4D shows the fuel cell bipolar plate of FIG. 4C after it has been overcoated with a layer of amorphous graphite.

Referring to FIG. 1, an exemplary preferred deposition overcoating step 120 includes a step 122 of coating the fuel cell bipolar plate 200 (more specifically, the titanium aluminum nitride layer 208) with a transition metal sub-layer 210 (FIG. 4C) and then a step 124 of coating the sub-layer 210 with a hydrophobic amorphous graphite top layer 212 (FIG. 4D). The transition metal sub-layer 210 can be any metal to which graphite/carbon readily adheres. An exemplary preferred sub-layer 210 comprises a 0.5-1.0 micron thick layer of chromium. Other suitable materials for the sub-layer 210 include, but are not limited to, titanium, nickel, iron and cobalt. The hydrophobic amorphous graphite layer 212 is preferably 2-5 microns in thickness.

The transition metal sub-layer 210 and then the amorphous graphite top layer 212 are deposited using the unbalanced magnetron sputtering process described above with reference to step 110. The same or a different chamber can be used for the overcoating step 120. The bipolar plate 200 to be overcoated is held at room temperature after an initial pump down to $10^{-6}$ Torr. The amorphous graphite layer 212 is at least partially formed as a continuous, random network structure and is substantially free of grain boundaries other than macroscopic porosities where deposition did not occur. After cooling, the bipolar plate 200 is taken out of the deposition chamber for use in a fuel cell without further treatment.

Referring to FIG. 4D, porosities 214 are shown (not necessarily to scale) in the layer 208. The porosities are coated, but may not be filled in completely, by the transition metal sub-layer 210. The amorphous graphite layer 212 is shown filling in the two porosities 214. It should be appreciated, however, that some porosities (not shown) are too small to be filled in by the amorphous graphite. Notwithstanding, the hydrophobic nature of the amorphous graphite layer 212 which coats the perimeter of such porosities even if it does not fill then helps to prevent gases and water from oxidizing the bipolar plate 200.

Figure 4E:
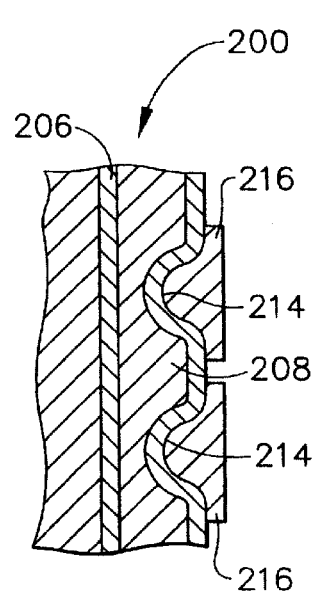
FIG. 4E shows the fuel cell bipolar plate of FIG. 4B after it has been subjected to a chemical anodization process to form a thin, discontinuous top layer composed of an oxide such as aluminum oxide which serves to fill in porosities in the coating.

Referring to FIG. 1, an alternative to the deposition overcoating step 120 is the chemical anodization overcoating step 130. In a preferred embodiment, the chemical anodization or oxidation overcoating step 130 seals the fine scale porosities in the layer 208 with a discontinuous low conductivity oxide layer 216 (FIG. 4E) such as aluminum oxide. In the case of aluminum oxide, the chemical anodization process infiltrates the fine scale porosity with internal layers of alumina. The layer 216 is primarily localized on the porosities as an amorphous structure and guides electrical charge to the layer 208 via discontinuities in the layer 216. Alternatively, the chemical anodization or oxidation overcoating step 130 seals the fine scale porosities in the layer 208 with a continuous (or discontinuous) layer 216 of material, such as a suboxide of titanium, which is sufficiently electrically conductive to permit electrical charge to pass through the layer 216 to the layer 208.

An exemplary preferred chemical anodization overcoating step 130 includes a step 132 of dipping the bipolar plate 200 into an acid bath, a step 134 of washing the bipolar plate 200 in deionized water, and a step 136 of boiling the bipolar plate 138 in water. An exemplary preferred step 132 comprises dipping the coated bipolar plate 200 in concentrated sulfuric acid (95-98% ACS reagent)at ambient temperature for 0.5-1.0 minute. Alternatively, chromic acid can be used. Alternatively, elevated temperatures and surfactants can be used to enhance acid penetration into the porosity 214. Another alternative is to use electrolytic oxidation. Next, at step 134, the bipolar plate 200 is removed from the acid bath, immediately immersed in deionized water and washed until free of acid. At step 136, the overcoating layer 216 is stabilized by boiling in deionized water for approximately 30 minutes. The bipolar plate 200 is then taken out of the water bath and blow-dried in air at room temperature prior to use. On titanium aluminum nitride, oxidation results in the formation of both aluminum and titanium oxides.

Figure 2:
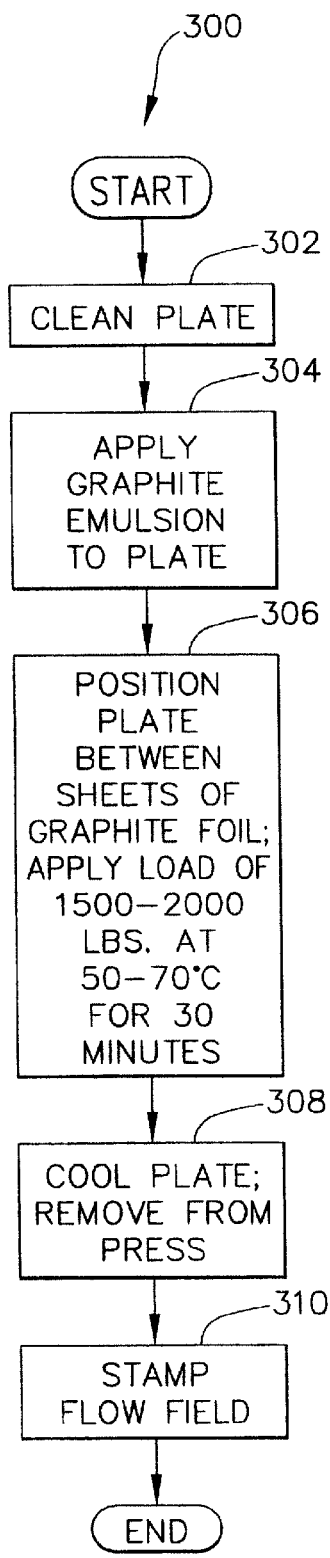
FIG. 2 is a flowchart of another exemplary preferred method for coating and overcoating a bipolar plate of a fuel cell according to the present invention.
Figure 5:
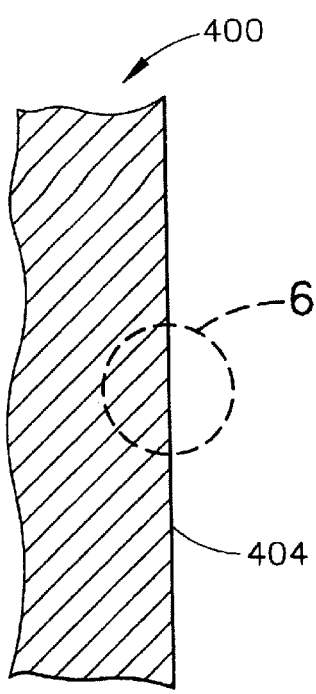
FIG. 5 is a cross-sectional, partial side view of a fuel cell bipolar plate.
Figure 6A:
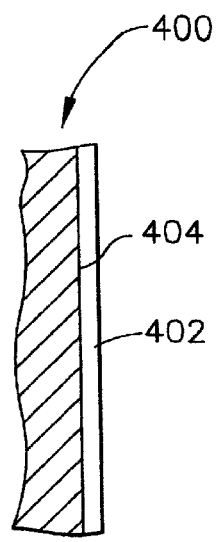
FIG. 6A is an enlarged view of a portion of the fuel cell bipolar plate of FIG. 5 after it has been coated with a layer of graphite emulsion.
Figure 6B:
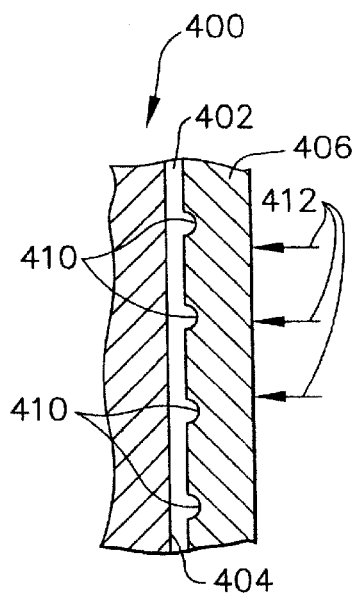
FIG. 6B shows the fuel cell bipolar plate of FIG. 6A after a sheet of graphite foil has been pressed over the layer of graphite emulsion which bonds the graphite foil to the bipolar plate and seals porosities in the graphite foil.

Referring to FIG. 2, an exemplary preferred method 300 according to the present invention for providing a fuel cell bipolar plate with a corrosion-resistant barrier includes a step 302 of cleaning a plate 400 (FIG. 5), a step 304 of applying a coating 402 (FIG. 6A) to an outer surface 404 of the plate 400, and a step 306 of providing an overcoating 406 (FIG. 6B). The bipolar plate 400 is the same as the previously described bipolar plate 200 with machined gas inlet holes, but typically is not formed with flow fields before the coating 402 and overcoating 406 are applied. An exemplary preferred bipolar plate 400 is made from aluminum and is 0.05-2.0 millimeters thick.

Preferably, the coating 402 and the overcoating 406 are both electrically conductive and hydrophobic. An exemplary preferred coating 402 is approximately 10 microns thick and comprises sonicated graphite particles in an emulsion, suspension or paint, e.g., graphite particles in an epoxy resin thinned by an organic solvent, such as toluene. A suitable graphite emulsion, Electrodag-423SS, is sold by Acheson Colloids Company, 1600 Washington Ave., P.O. Box 611747, Port Huron, Mich. 48061-1747. An exemplary preferred overcoating 406 comprises exfoliated graphite in the form of sheets of flexible, graphite foil such as those manufactured by UCAR Carbon Company Inc., P.O. Box 94637, Cleveland, Ohio 44101 and sold under the tradename, GRAFOIL™. The graphite foil, GRAFOIL™, is formed from particulate graphite flakes which have been processed through an intercalation process. Although anisotropic and with some degree of ordering, GRAFOIL® is highly electrically conductive and hydrophobic. The thickness of the graphite foil overcoating 406 is 0.05-1.0 millimeters, for example, and preferably 0.5 millimeters.

Referring to FIG. 6B, it can be seen that the overcoating 406 has porosities 410. The coating 402 bonds the overcoating 406 to the bipolar plate 400 and fills the porosities 410.

Figure 6C:
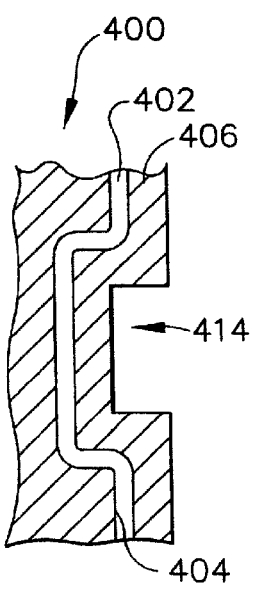
FIG. 6C shows the fuel cell bipolar plate of FIG. 6B after a flow field has been stamped in it deforming both the graphite foil and the underlying metal plate.

Referring to FIG. 2, according to the exemplary preferred method 300, the bipolar plate 400 is cleaned at step 302 and then uniformly painted on both sides with the graphite emulsion 402 at step 304. Next, at step 306, the bipolar plate 400 is positioned between two sheets of graphite foil 406 under a load represented by arrows 412 (FIG. 6B) of 1,500-2,500 pounds applied by a conventional press (not shown) at a temperature of 50-70° C. for 30 minutes. At step 308, the bipolar plate 400 is allowed to cool to room temperature under load and is then taken out of the press. At step 310, flow fields 414 (FIG. 6C) are formed, for example, by a stamping operation which results in the deformation of both the graphite foil 406 and the metal plate 400. For the sake of clarity, the porosities 410 are not shown in FIG. 6C. Preferably, the sheets of the graphite foil overcoating 406 have the same shape and basal dimensions as the bipolar plate 400. In an alternative preferred production method, coils or rolls of plate material and graphite foil are fed together through a conventional roll mill or the like, cut to size after they are pressed together by the roll mill and then stamped to form flow fields.

Although the present invention has been described in terms of the preferred embodiment above, numerous modifications and/or additions to the above-described preferred embodiment would be readily apparent to one skilled in the art. It is intended that the scope of the present invention extend to all such modifications and/or additions.

The invention claimed is:

1. A coated fuel cell bipolar plate comprising: a metal plate; an electrically conductive corrosion resistant coating formed over the metal plate, the coating including a top surface and porosities; and an electrically conductive overcoating formed over the electrically conductive corrosion resistant coating, the overcoating sealing some or all of the porosities at the top surface of the electrically conductive corrosion resistant coating, wherein the electrically conductive corrosion resistant coating has a plurality of layers.

2. The coated fuel cell bipolar plate of claim 1, wherein the electrically conductive corrosion resistant coating includes titanium.

3. The coated fuel cell bipolar plate of claim 1, wherein the electrically conductive corrosion resistant coating includes titanium nitride.

4. The coated fuel cell bipolar plate of claim 1, wherein the electrically conductive corrosion resistant coating includes titanium aluminum nitride.

5. The coated fuel cell bipolar plate of claim 1, wherein the electrically conductive corrosion resistant coating includes: a sub-layer coated over the outer surface; and a layer coated over the sub-layer; wherein the sub-layer promotes adhesion of the layer to the sub-layer.

6. The coated fuel cell bipolar plate of claim 5, wherein the sub-layer includes titanium.

7. The coated fuel cell bipolar plate of claim 5, wherein the sub-layer includes stainless steel.

8. The coated fuel cell bipolar plate of claim 5, wherein the layer includes titanium aluminum nitride.

9. The coated fuel cell bipolar plate of claim 1, wherein the overcoating is hydrophobic.

10. The coated fuel cell bipolar plate of claim 1, wherein the overcoating includes amorphous graphite.

11. A coated fuel cell bipolar plate comprising: a metal plate; an electrically conductive corrosion resistant coating formed over the metal plate, the coating including a top surface and porosities; and an electrically conductive overcoating formed over the electrically conductive corrosion resistant coating, the overcoating sealing some or all of the porosities at the top surface of the electrically conductive corrosion resistant coating, wherein the overcoating includes: a first layer of transition metal coated over the coating; and a second layer of amorphous graphite coated over the first layer.

12. The coated fuel cell bipolar plate of claim 11, wherein the transition metal includes chromium, titanium, nickel, iron, or cobalt.

13. A coated fuel cell bipolar plate comprising: a metal plate; an electrically conductive corrosion resistant coating formed over the metal plate, the electrically conductive corrosion resistant coating including a top surface and porosities; and an anodized or oxidized overcoating formed over the electrically conductive corrosion resistant coating, the overcoating being primarily localized on each of the porosities at the top surface as discrete amorphous structures.

14. The coated fuel cell bipolar plate of claim 13, wherein the metal plate includes aluminum.

15. The coated fuel cell bipolar plate of claim 13, wherein the coating has a plurality of layers.

16. The coated fuel cell bipolar plate of claim 13, wherein the coating includes titanium.

17. The coated fuel cell bipolar plate of claim 13, wherein the coating includes titanium nitride.

18. The coated fuel cell bipolar plate of claim 13, wherein the coating includes titanium aluminum nitride.

19. The coated fuel cell bipolar plate of claim 13, wherein the coating includes: a sub-layer coated over the outer surface; and a layer coated over the sub-layer; wherein the sub-layer promotes adhesion of the layer to the sub-layer.

20. The coated fuel cell bipolar plate of claim 19, wherein the sub-layer includes titanium.

21. The coated fuel cell bipolar plate of claim 19, wherein the sub-layer includes stainless steel.

22. The coated fuel cell bipolar plate of claim 19, wherein the layer includes titanium aluminum nitride.

23. The coated fuel cell bipolar plate of claim 13, wherein the overcoating comprises aluminum oxide.

24. The coated fuel cell bipolar plate of claim 13, wherein the overcoating is sufficiently electrically conductive to permit an electrical charge to pass through the overcoating to the coating.

25. The coated fuel cell bipolar plate of claim 13, wherein the overcoating comprises a suboxide.

26. The coated fuel cell bipolar plate of claim 25, wherein the suboxide comprises a suboxide of titanium.

* * * * *